Aug. 4, 1936.  C. A. FLOOD  2,049,999
STRING LOOPING APPARATUS AND METHOD
Filed July 24, 1934  9 Sheets-Sheet 1

Aug. 4, 1936.  C. A. FLOOD  2,049,999
STRING LOOPING APPARATUS AND METHOD
Filed July 24, 1934  9 Sheets-Sheet 3

Inventor
Carl A. Flood
by Pluto Cushman & Woodbury
attys.

Aug. 4, 1936.          C. A. FLOOD                2,049,999
STRING LOOPING APPARATUS AND METHOD
Filed July 24, 1934          9 Sheets-Sheet 5

Inventor
Carl A. Flood

Aug. 4, 1936.   C. A. FLOOD   2,049,999
STRING LOOPING APPARATUS AND METHOD
Filed July 24, 1934   9 Sheets-Sheet 6

Aug. 4, 1936.　　　C. A. FLOOD　　　2,049,999
STRING LOOPING APPARATUS AND METHOD
Filed July 24, 1934　　　9 Sheets-Sheet 7

Aug. 4, 1936.  C. A. FLOOD  2,049,999

STRING LOOPING APPARATUS AND METHOD

Filed July 24, 1934  9 Sheets-Sheet 8

Aug. 4, 1936.  C. A. FLOOD  2,049,999
STRING LOOPING APPARATUS AND METHOD
Filed July 24, 1934   9 Sheets-Sheet 9

Patented Aug. 4, 1936

2,049,999

UNITED STATES PATENT OFFICE 2,049,999

STRING LOOPING APPARATUS AND METHOD

Carl A. Flood, Framingham, Mass., assignor to Dennison Manufacturing Company, Framingham, Mass., a corporation of Massachusetts Application July 24, 1934, Serial No. 736,693

26 Claims. (Cl. 93—91)

This invention relates to the manufacture of string loops and the like and more particularly to string-loop tags of the type disclosed in my copending application Serial No. 723,170 filed April 30, 1934, in which the two ends of each string loop are secured together by a metallic clip, although in certain aspects the invention may be utilized in forming string loops in which the ends of each loop are secured together in some other way as by knotting.

Objects of the invention are to provide a method and apparatus for making string loops and applying them to articles rapidly and uniformly and to provide a simple and facile manner of accommodating tags of different sizes and of forming string loops of different lengths.

In one aspect the invention involves a machine comprising two principal groups of mechanism, namely loop-forming mechanism for forming string loops in the tags and loop-attaching mechanism for securing the two ends of each loop together. These two mechanisms are preferably mounted separately on a common frame so that one mechanism may readily be adjusted relatively to the other mechanism to accommodate tags of different sizes and/or to form loops of different lengths. In the preferred embodiment hereinafter described the loop-forming mechanism is mounted at the right-hand end of the machine and the loop-attaching mechanism at the left-hand end.

In another aspect the invention involves first threading a string through aligned openings in a pack of tags, feeding the tags individually from the foremost end of the pack and drawing the string through the pack to form a loop for each tag removed from the pack.

In still another aspect the invention involves the automatic formation, from a metallic ribbon, of metallic clamps or clips for securing together the ends of each string loop. The ribbon is preferably fed into the machine in flat form, then bent transversely into U shape in cross-section, and then bent into cylindrical shape in cross-section to embrace the ends of the string loop and clamp them together, the metal ribbon preferably being clamped around the ends of a plurality of string loops before the foremost clip is severed from the end of the ribbon and the portions of the strings between successive loops preferably being cut off by the same cutting knife which severs the metallic ribbon.

For the purpose of illustration a preferred embodiment of the invention is shown in the accompanying drawings, in which.

Fig. 18 is a left end elevation of the loop-forming mechanism, the main frame being shown in cross section;

Figures 9, 10, 11, 12, 13, 14:
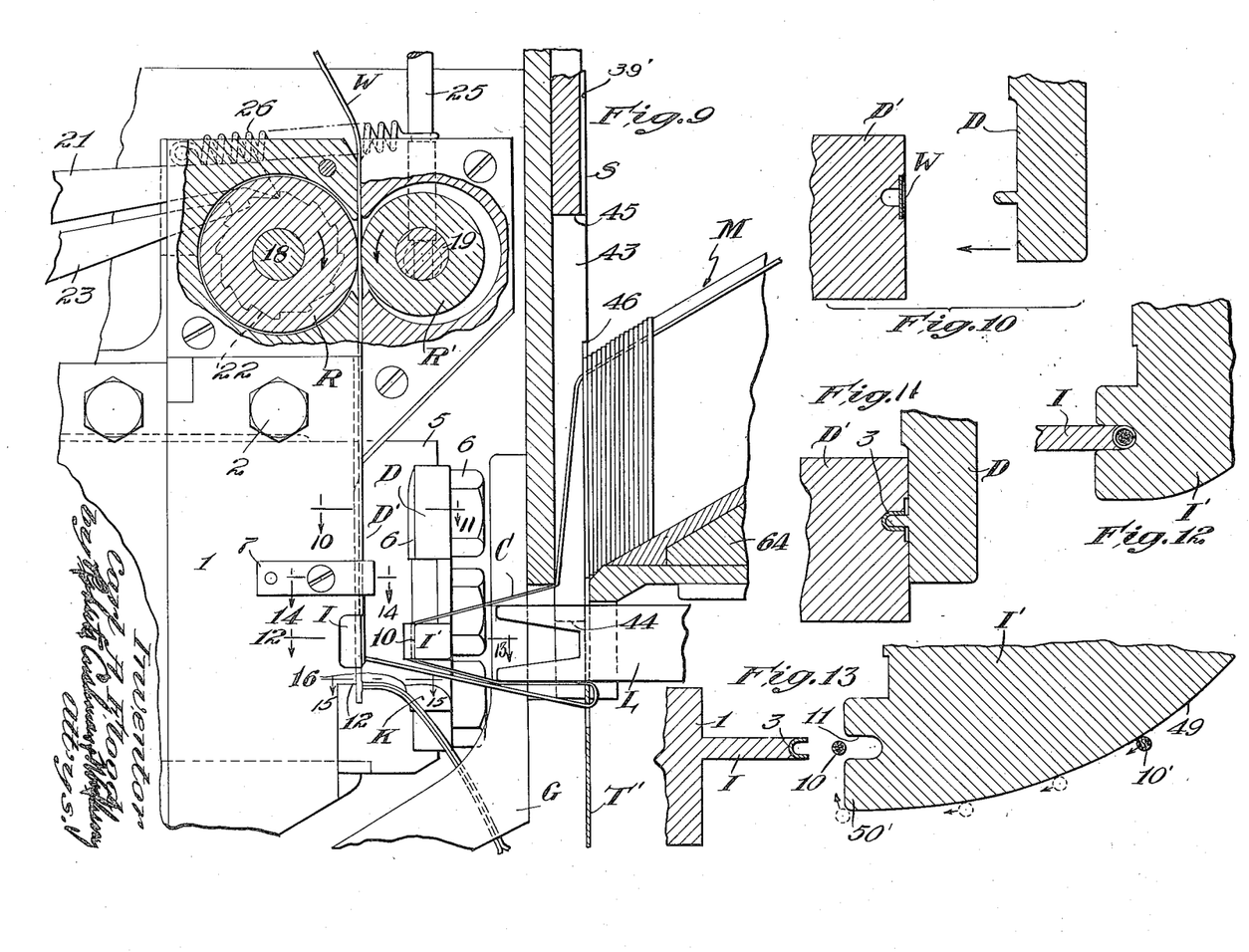
Fig. 9 is an enlarged front view of the central portion of the machine, parts being shown in section.
Figs. 10 and 11 are sections on line 10—11 of Fig. 9, showing the parts in different relative positions.
Figs. 12 and 13 are sections on line 12—13 of Fig. 9, showing the parts in different relative positions.
Fig. 14 is a section on line 14—14 of Fig. 9.
Figures 9A, 9B, 16:
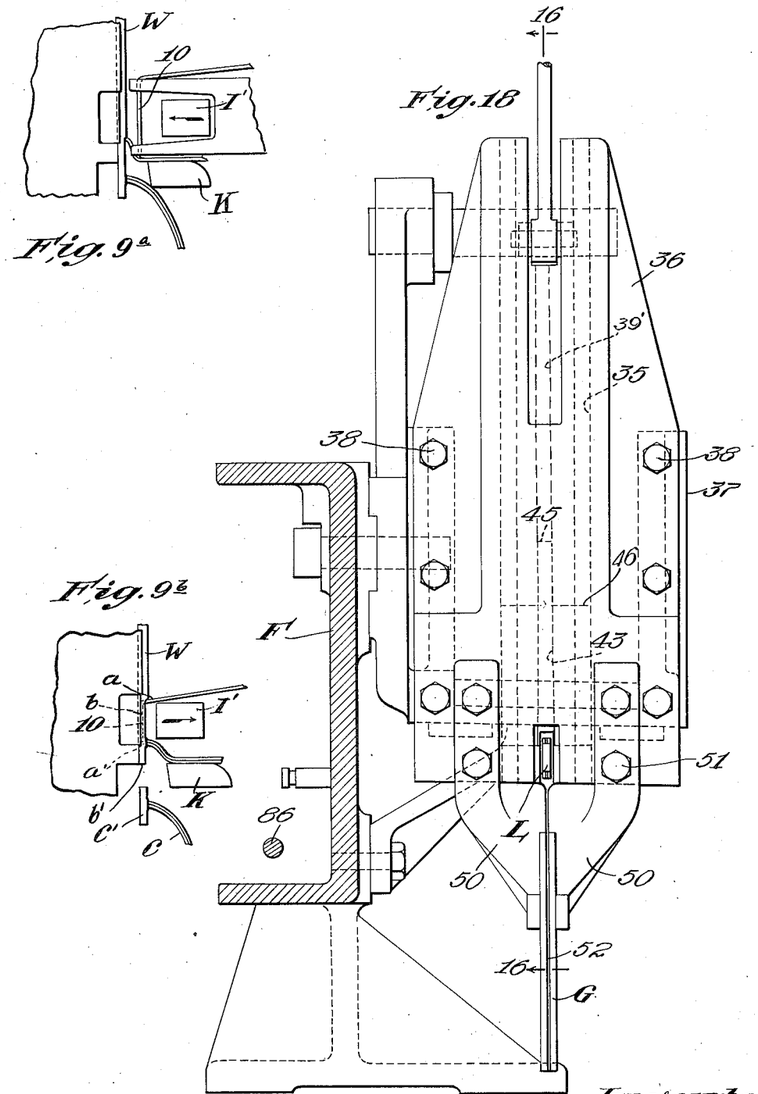
Figs. 9a and 9b are enlarged detail views of the loop-attaching parts in two successive positions.
Fig. 16 is a vertical longitudinal section on line 16—16 of Fig. 18, through the loop-forming mechanism.
Figures 19, 20:
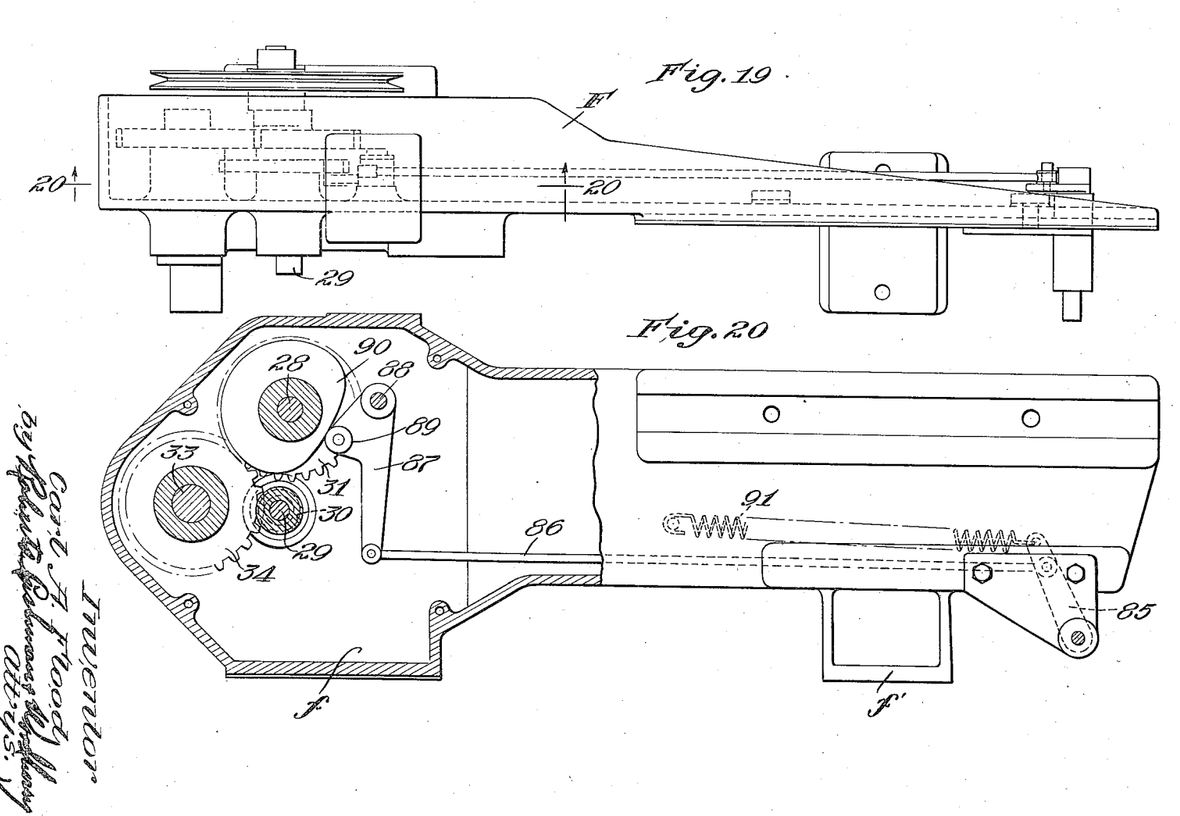
Fig. 19 is a top plan view of the main frame of the machine, showing a part of the driving mechanism.
Fig. 20 is a section on line 20—20 of Fig. 19.

In general the particular embodiment of the invention chosen for the purpose of illustration comprises a main frame F extending the full length of the machine as shown in Fig. 19 and having two depending portions f and f' adapted to rest on a suitable support, a magazine M inclining downwardly and to the left from the upper right-hand end of the machine (Fig. 3) for holding a group of tags T in the form of a pack with a string C extending from a ball B through the openings in the tag, a vertically reciprocating slicer S movable from the upper position shown in Fig. 9 to the lower position shown in Fig. 16 for slicing the foremost tag from the pack, a looper L reciprocating back and forth from the advanced position shown in Fig. 9 to the retracted position shown in Fig. 16 for looping the string between successive tags, feed rollers R and R' for feeding flat metal wire W from a reel E downwardly to the loop-attaching mechanism comprising the male dies D and I and the female dies D' and I', a horizontally reciprocating knife K for simultaneously cutting off the end of the metallic ribbon and severing the string between loops after the ribbon has been clamped around the ends of the foremost loop and the leading end of the next loop, and a slotted guide G down which the finished tags slide from the machine.

The loop-attaching mechanism: The dies D' and I comprise a plate I mounted on the frame of the machine by means of screws 2. The right-hand vertical edge of this plate is grooved as shown in Figs. 10 to 13, the lower right-hand portion of the plate being reduced in cross-section as shown in Figs. 9, 12, and 13 to form the die I. The dies D and I' are mounted on a horizontal slide 5 by means of screws 6, the dies projecting forwardly from the slide 5. On the left-hand face of the forward end of die D is a vertical ridge aligned with the groove in die D', and as shown in Fig. 9 the upper end of this ridge is beveled off. Thus when the wire W is fed downwardly over the grooved die D' and the male die D is reciprocated to the left until its ridge projects into the groove the metal ribbon is bent into U shape as shown in Fig. 11; and by beveling off the upper end of the ridge the flat shape of the wire gradually merges into the U shape. The length of the ridge is preferably greater than the distance the wire is fed at each intermittent advance so that the shaping of the wire is performed largely if not entirely by the upper portion of the ridge. After the wire is thus bent transversely into U shape it feeds downwardly under a guide 7 which, as shown in Fig. 14, is L shaped in cross-section, one end being secured to the plate I by means of a screw 8 and the other end having a ridge 9 projecting into the groove in the U shaped wire. After the wire passes the guide 7 it feeds along the groove in the edge of the reduced portion I of the plate I opposite the forming die I' which bends the two sides of the U shaped wire together to form a cylinder surrounding and clamping a portion of the string. Before the die I' moves to the left thus to clamp the U shaped wire the string is moved to the position indicated at 10 in Figs. 9 and 11 by mechanism later to be described. Then when the die I' moves to the left the string seats in the bottom of the groove 11 in the die and is thereby carried into the U shaped wire. As the string enters the U shaped wire the sides of the wire engage the sides of the groove thereby pinching the sides around the string as shown in Fig. 12.

Figure 6:
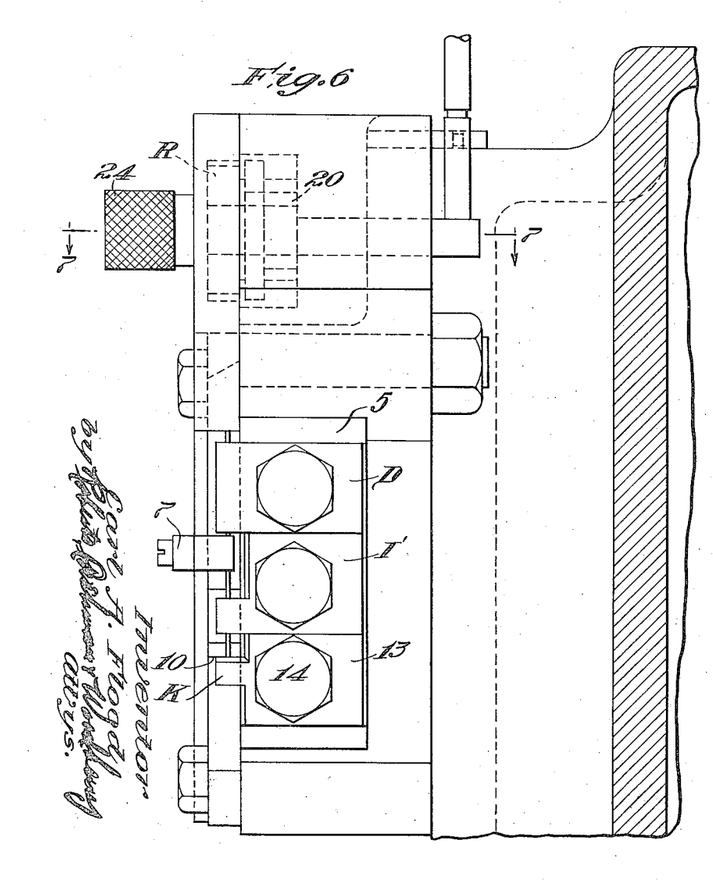
Fig. 6 is a right end elevation of the loop-attaching mechanism shown at the left-hand end of Fig. 3, a part of the frame of the machine being shown in cross-section.
Figures 15, 16:
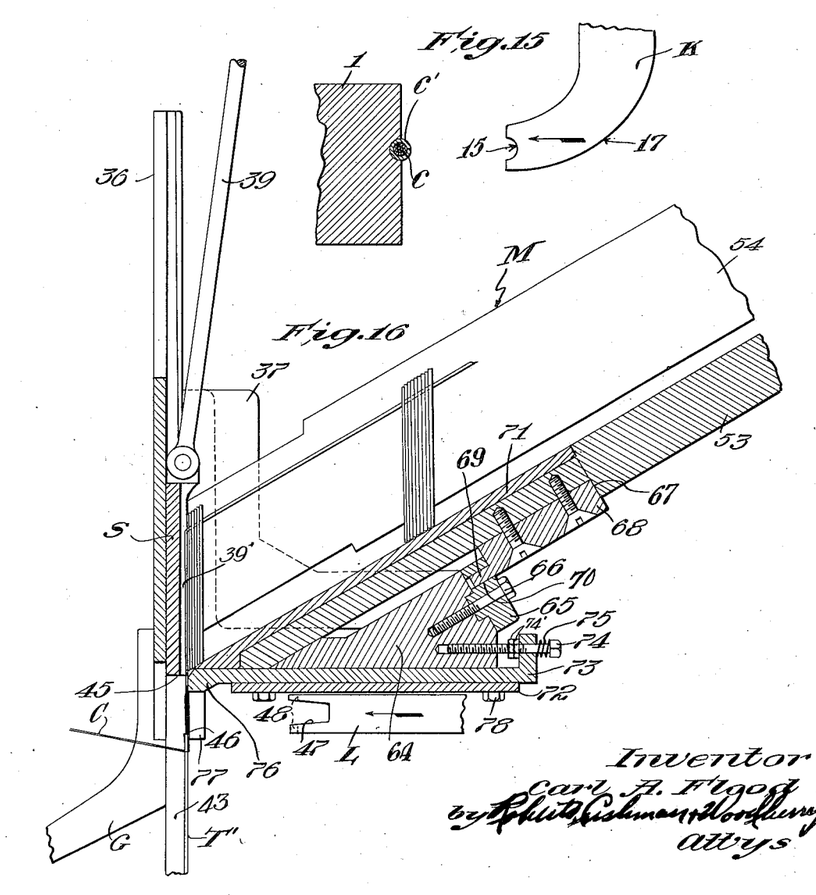
Fig. 15 is a section on line 15—15 of Fig. 9.

After the wire has been thus clamped around the string on each side of the foremost loop the wire and string are simultaneously severed by the cutter K which cooperates with a cutting edge 12 on the die plate I. As shown in Figs. 6 and 15 the cutter is L shaped, the end 13 being secured to the slide 5 by means of a screw 14 and the other end having a groove 15 to straddle the wire, the upper edge of the bottom of the groove constituting the cutting edge. As shown in Fig. 15 the side 17 of the cutter K is curved to cause the string loop to slide past the cutter as the loop passes the cutter in moving downwardly to severing position.

As shown in Figs. 9a and 9b each step feed of the metal ribbon is substantially equal in length to the distance between two successive loops plus twice the diameter of the string. Thus the point half way between loops at which the string and ribbon are to be cut off move from $b$ to $b'$ and the point half way between the ends of an uncut clip moves from point $a$ to $a'$. The cutter K and die I' are so spaced lengthwise of the wire that the vertical distance between the cutting edge and the center of the die I' is approximately equal to the length of a finished clip and the vertical dimension of the die I' is approximately equal to the length of one clip less twice the diameter of the string so that, when the die I' pushes the portion 10 of the string into the U shaped wire, the portion 10 lying in the wire extends downwardly substantially to the point where the previously clamped portion of the string emerges from the clamped ribbon. As shown in Fig. 9a the ribbon has just been advanced ready for the die I' and cutter K to move to the left and in Fig. 9b the parts are shown in the positions which they occupy after the die I' and cutter K have first moved to the left and thence back to the right. In view of the foregoing description it will be understood that inasmuch as the die I' is mounted on the same slide with die D and cutter K all three parts move back and forth together, the wire being advanced one step between each back and forth movement.

Figure 7:
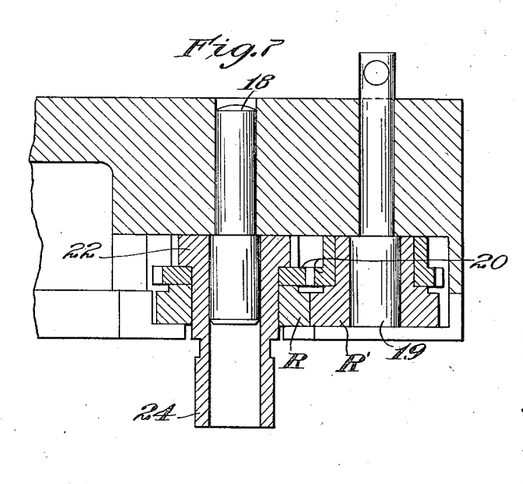
Fig. 7 is a section on line 7—7 of Fig. 6.

The feed rollers R and R' for advancing the wire ribbon are mounted on shafts 18 and 19 and are interconnected by spur gears 20 (Figs. 6 and 7). The rollers are advanced step by step by a pawl 21 operating on a ratchet wheel 22, a stop 23 being provided to prevent retrograde movement of the ratchet wheel. The roller R is provided with a knurled handle 24 (Figs. 6 and 7) to advance the ribbon by hand in threading the machine, the ratchet 22 then sliding freely under the pawls 21 and 23. The roller R' is eccentrically mounted on the shaft 19 so that rotation of the shaft in a clockwise direction (Fig. 9) moves the roller R' away from the roller R to free the ribbon. The shaft 19 is provided with a handle 25 for thus moving the roller R' away from the roller R and a spring 26 is interconnected between the handle and the frame to hold the roller R' in gripping relation with the ribbon.

The driving mechanism for the wire-feed rollers comprises a crank 27 mounted on the shaft 28 which is connected to the main drive shaft 29 through spur gears 31, 34 and 30 (Figs. 19 and 20). The die-actuating slide 5 is also driven through an eccentric 32 mounted on shaft 33 which is driven by the gear 34 meshing with the aforesaid gear 30. In transit from the reel E to the forming mechanism the wire passes over an oscillatory eccentric 95 which tends to produce slack between the reel and feed rolls, thus reducing the work of the feed rolls and thereby increasing the accuracy of feed.

Figures 14, 17:
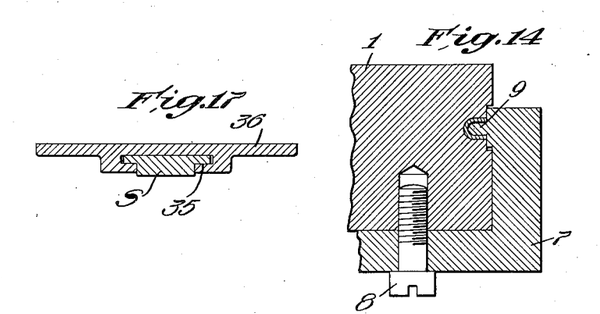
Fig. 17 is a section on line 17—17 of Fig. 3.

The tag-looping mechanism: As shown in Figs. 16, 17 and 18 the vertically reciprocating slider S for slicing the foremost tag from the pack of tags in the magazine M slides in a T shaped groove 35 in an upstanding plate 36 mounted on the magazine frame piece 37 by means of screws 38. The slicer is reciprocated back and forth between the upper position shown in Fig. 9 and the lower position shown in Fig. 16 by means of a rod 39, a rocker arm 40 rocking on shaft 41 and a link 42 adjustably connected to the crank 27 so that its lower end may be adjusted radially of the crank to vary the stroke of the slicer for the purpose of accommodating tags of different lengths. The slicer has a slot 43 extending upwardly from its lower end 44 to the point 45 to accommodate the string and looper L as shown in Figs. 9 and 18 and it is also provided with a shoulder 46 to slice off the foremost tag. A groove 39' extends vertically along the middle of the right-hand side of the slide to receive the string (Figs. 9, 16 and 18).

Figure 8:
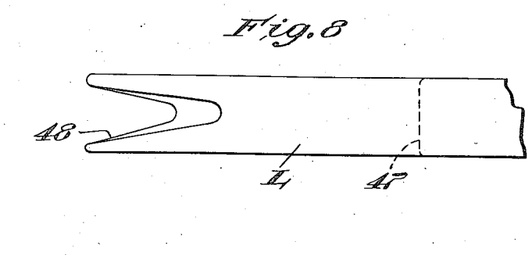
Fig. 8 is a top plan view of the loop-forming mechanism mounted at the right-hand end of the machine.

After the foremost tag has been moved from the pack by the slicer to the position indicated at T' in Figs. 9 and 16 the looper L moves from the right-hand position shown in Fig. 16, through a widened portion in the slot of guide G, to its left-hand position shown in Fig. 9, to push that portion of the string between the tag T' and the pack to the position shown in Fig. 9, the left-hand end of the looper L having a deep horizontal notch 47 as shown in Figs. 9 and 16 to permit the looper to straddle the die I' and relatively shallow vertical notches 48 for the string as shown in Fig. 8, and the guide G serving as looping means by holding the string at the center of the loop being formed by the looper. As the looper moves to the left that portion 10 of the string bridging the notch 47 slides around the curved end of the die I' as illustrated in Fig. 13, the string first contacting the curved surface 49 of the die at the point marked 10', and, after passing the corner 50', snapping to the position marked 10 in Fig. 13 by virtue of its own elasticity. With the portion 10 of the string in this position it is picked up by the die I' when the latter moves to the left as above described. The former L then moves back to the right to permit the slicer S to feed another tag from the magazine.

As shown in Figs. 3, 9, 16 and 18 the guide G for guiding the tags after they leave the magazine comprises two parts 50 secured to the plate 37 by screws 51 and spaced apart to provide a slot 52 wide enough to permit the passage of the string loop. After the ends of the string loops have been secured together by the clips C' and the clips cut off, the string-tags drop to the position shown in Fig. 3 wherein the clips slide downwardly to the left along the upper surface of the guide G.

The tag magazine: The magazine M comprises a bottom 53, preferably in the form of a wooden board, and two sides 54 in the form of metal channels (Fig. 4) which are mounted on the bottom 53 by means of brackets 55 fitting over the ends of a pin 56 and secured thereto by means of set-screws 57. By adjusting the brackets 55 in and out on the pin 56 the width of the magazine may be varied to accommodate tags of different widths. At the rear of the magazine is an upstanding magazine-supporting plate 58 which carries at its upper right-hand end a pin 59 to support the bottom 53, the pin carrying a circular part 60 which extends into an elongate recess 61 in the bottom 53 to permit endwise adjustment of the bottom while holding the magazine against transverse movement, the member 60 being secured to the pin 59 by means of a set screw 62. A metal plate 63 covers the under side of the bottom 53 around the elongate recess 61 to bear on the pin 59. At its left-hand end the supporting plate 58 has a forward extension 64 extending under the lower end of the magazine, and as shown in Fig. 16 a plate 65 is mounted on this extension 64 for adjustment from front to rear by means of a screw 66 extending through a slot in the plate 65. Mounted in a recess 67 in the under side of the bottom 53 is a plate 68 having a projection 69 fitting in an opening 70 in the plate 65. Thus when the plate 65 is adjusted from front to rear the magazine is likewise adjusted by virtue of the interengagement at 69—70, it being understood of course that when the lower end of the magazine is thus adjusted the part 60 is correspondingly adjusted on the pin 59 at the upper end of the magazine. Mounted in a recess on the upper side of the lower end of the bottom 53 is a metallic plate 71 to provide a more rigid and permanent surface. Mounted on the bottom of the magazine-frame extension 64 by screws 78 is a plate 72 and between the extension and a plate a slide 73 is adjustable from right to left by a screw 74, a spring 75 being provided to hold the slide against the stop and lock nuts 74'. The left-hand end of the slide has a depending portion 76 spaced from the slicer a distance approximately equal to the thickness of the tag and having a slot 77 to accommodate the former L.

The magazine and the slicer may be adjusted from right to left by means of the screws 79 extending through the slot 80 and threading into the frame F, thus to permit the formation of longer or shorter string loops.

The looper L reciprocates in a guide 81 (Fig. 3) and is driven through a link 82, a lever 83, a shaft 84, another arm 85 (Fig. 20), a link 86, an arm 87 pivoted to the frame at 88, a cam follower 89 and a cam 90 mounted on the shaft 28. A spring 91 yieldingly urges the looper to the left and the cam 90 pushes it to the right against the action of the spring. To adjust the throw of the looper L the right-hand end of the link 82 is adjustable longitudinally of an arcuate slot 92 in the arm 83, and by making this arcuate slot concentric with the point of connection between the link 82 and the looper L the looper stops in the same position at the forward (left-hand) end of its stroke irrespective of the length of stroke to which the link 82 is adjusted along the slot 92.

Figures 1, 2:
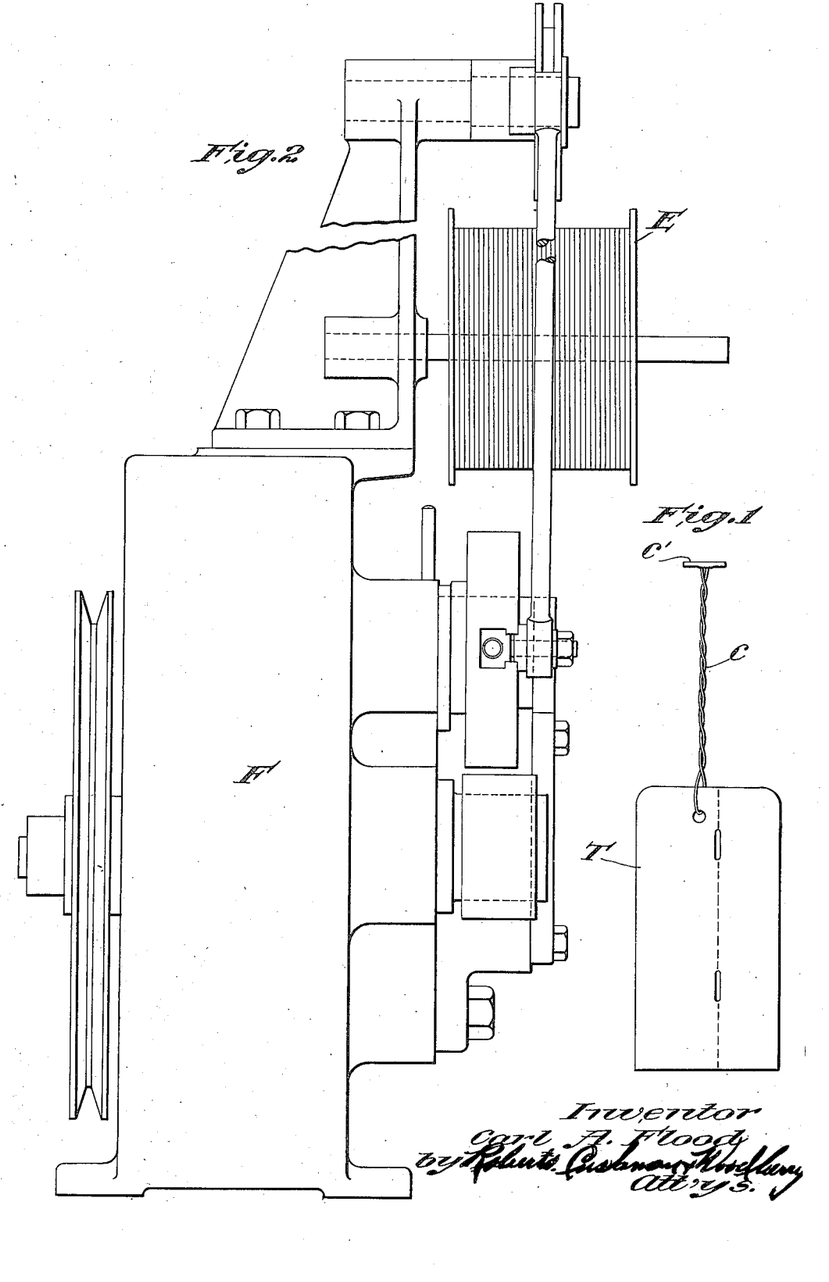
Fig. 1 is a side view of a string-loop tag made according to the present invention.
Fig. 2 is a left end elevation of the machine for making the tag.
Figures 3, 4, 5:
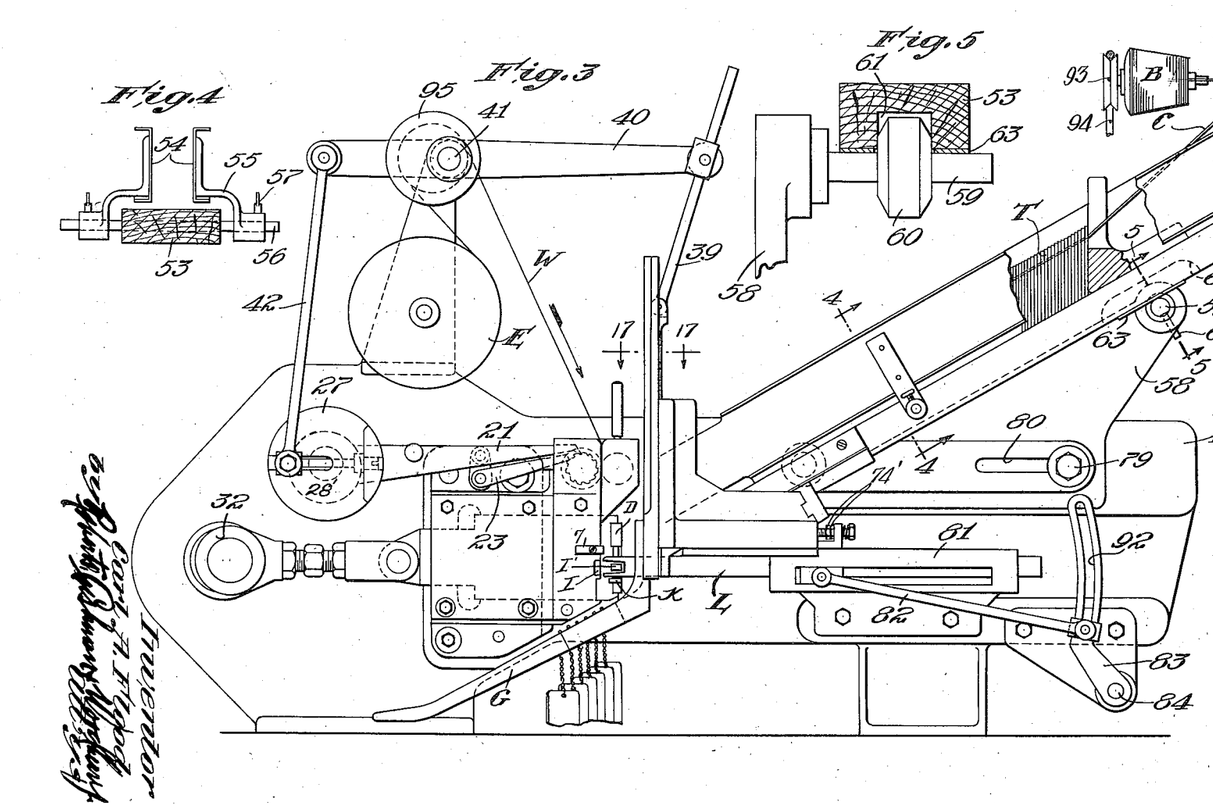
Fig. 3 is a front elevation of the machine.
Figs. 4 and 5 are sections on lines 4—4 and 5—5 of Fig. 3.

For the purpose of causing the string loops automatically to spiral into the form shown in Fig. 1 means are provided continuously to twist the string as it is fed to the machine, preferably in the same direction as the string is previously twisted in its process of manufacture. As shown in Fig. 3 the twisting means comprises a pulley 93 and belt 94 which are preferably driven from the same source of power as the other parts of the machine so that the degree of twisting is uniform for successive loops. Thus the loops are formed while the string is partially twisted and consequently when the string is cut off the string loop automatically spirals as shown in Fig. 1 by virtue of the tendency of the string to untwist back into the initial form in which it was wound on the ball B. With the string loop twisted in this manner there is substantially no tendency for the string loops to tangle together as the tags are delivered from the machine and the resulting product is also more convenient to use.

Figure 21:
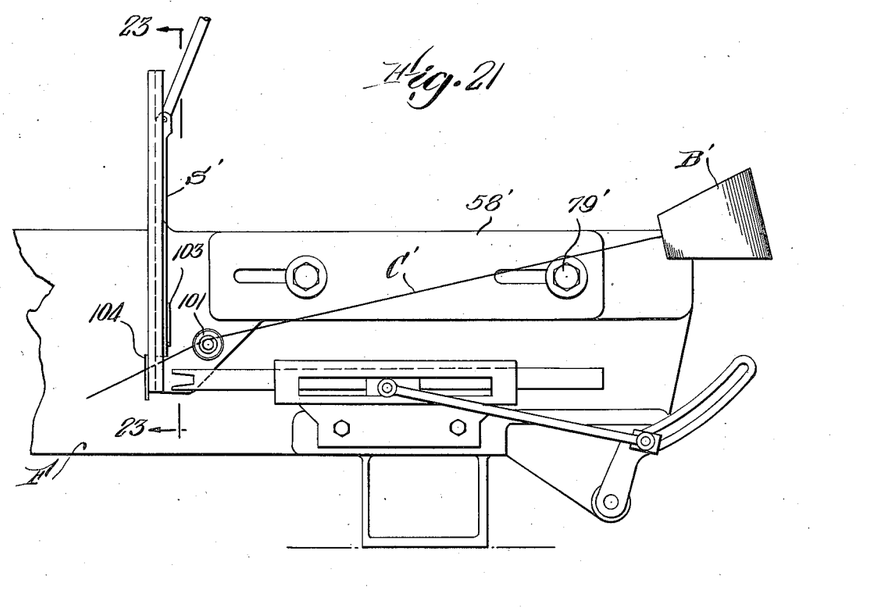
Fig. 21 is a front elevation corresponding to Fig. 3, showing a modification for forming a series of string loops without tags.
Figure 22:
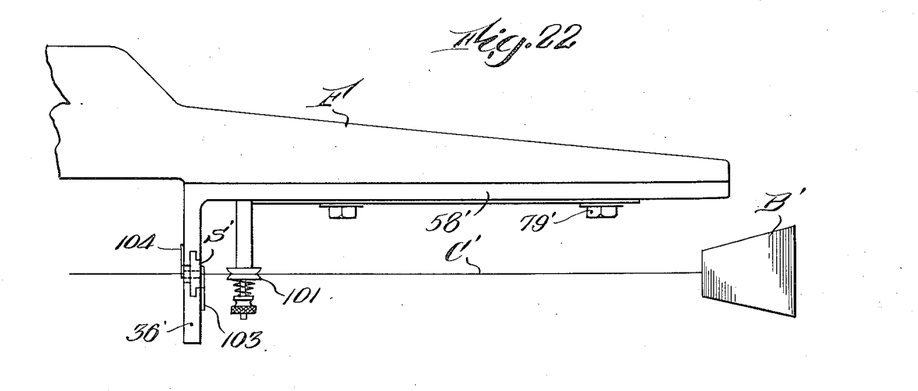
Fig. 22 is a plan view of the same modification.
Figure 23:
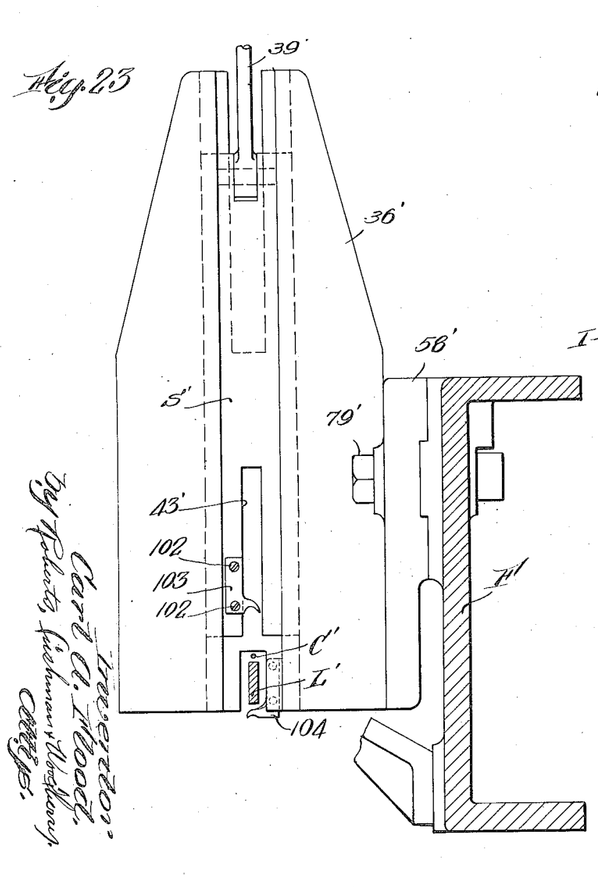
Fig. 23 is a sectional view on line 23—23 of Fig. 21.

The modification shown in Figs. 21 to 28 inclusive differs from that above described in the following respects. The frame piece 58 which carries the magazine in the first embodiment is replaced by a frame piece 58' held to the frame F by screws 79' and carrying a tension device 101 for the string C' which is fed from the ball B'. The vertically reciprocating slicer S of the first embodiment is converted into a slider S' adapted to operate on the string without tags by mounting on the right-hand face of the slider, by means of screws 102, a hook 103. A similar hook 104 is mounted on the back of the slider guide 36' as shown in Figs. 21, 22 and 23.

Figures 24, 25, 26, 27, 28:
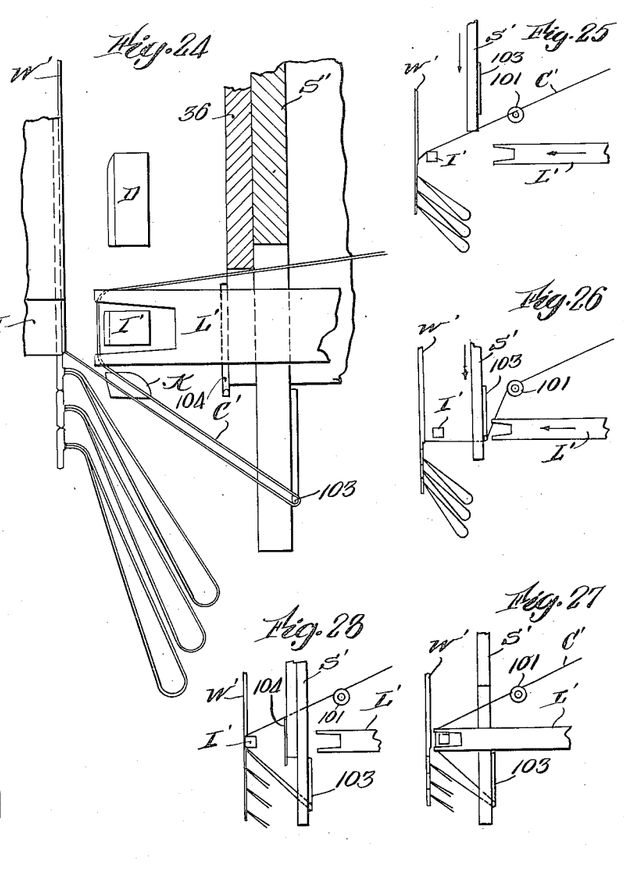
Fig. 24 is an enlarged detail view of the modification showing the parts in the positions which they occupy while the loop-former is moving to the left.
Figs. 25 to 28 are diagrammatic views of the modification showing the parts in successive positions during a cycle of operations.

The operation of this modification is like that of the first embodiment except in the following respects. As the slider S' descends the hook 103 engages the cord C', moving it down to the position shown in Fig. 24. The former L' then moves to the left to carry the portion of the string immediately above hook 103 to the left into position to be gripped in the metallic ribbon W'. The former L' then returns to the right and the slider S' returns to its upper position. In the upward movement of the slider S' the last formed loop engages the hook 104 and is thereby stripped off of the hook 103, permitting the loop to fall downwardly as illustrated in Fig. 24. Fig. 25 shows the parts in the positions which they occupy as the slider S' starts downwardly to form another loop. Fig. 26 shows the parts in the positions which they occupy as the hook 103 on the slider passes the former L' and as the former picks up the portion of the string between the hook 103 and the tension device 101. In Fig. 27 the slider S' is in its lowermost position and the former L' is in its extreme left-hand position. In Fig. 28 the former has retracted to its initial position and the die I' has clamped the edges of the metal ribbon W' over the string above the last formed loop.

Instead of having the cutter K completely sever the clips it may only partially sever them so that they may be readily broken apart whenever desired. Thus in Fig. 24 the clips are shown as having been only partially severed; and it will of course be understood that this same expedient may if desired be employed in the first embodiment. To accomplish this result it is necessary only to shorten the forward stroke of the cutter K so that it does not completely sever the clips.

It should be understood that the present disclosure is for the purpose of illustration only and that this invention includes all modifications and equivalents which fall within the scope of the appended claims.

I claim:

1. Apparatus for applying string loops to tags having openings therein, comprising means for holding the tags in a pack with their openings in register with each other and a string extending therethrough, means for moving the foremost tag edgewise from the pack along a predetermined path, means movable crosswise of the plane of the tag for drawing said string through said pack to form a loop including said moved tag, means for severing the loop from the string, and means for holding the end of the string for a looping operation on the next tag in the pack.

2. Apparatus for applying string loops to tags having openings therein, comprising means for holding the tags in a pack with their openings in register with each other and a string extending therethrough, means for moving the foremost tag from the pack and drawing said string through said pack a predetermined distance, means for forming a closed loop including said moved tag, means for joining the ends of the loop with a metal clip, and means for severing the loop from the string while holding the end of the string for a looping operation on the next tag in the pack.

3. Apparatus for applying string loops to tags having openings therein, comprising means for holding the tags in a pack with their openings in register with each other and a string extending therethrough, a slicer for moving the foremost tag edgewise from the pack, means movable transversely of the plane of the tag for drawing said string through said pack a predetermined distance, means to form the drawn string into a loop including said moved tag, and means for severing the loop from the string while holding the end of the string for a looping operation on the next tag in the pack.

4. Apparatus for applying string loops to tags having openings therein, comprising means for holding the tags in a pack with their openings in register with each other and a string extending therethrough, a guide extending transversely of the pack with a longitudinal slot to receive the end of the string, means for moving the foremost tag from the pack along one side of said guide with the tag overlapping the edges of the slot, means for moving that portion of the string between the moved tag and the pack through said slot to form a loop including said moved tag, means on the other side of said guide for uniting the ends of the loop, and means for severing the loop from the string while holding the end of the string for a looping operation on the next tag in the pack.

5. Apparatus for applying string loops to tags having openings therein, comprising means for holding the tags in a pack with their openings in register with each other and a string extending therethrough, means for successively moving successive tags from the pack, means for forming a closed loop including each moved tag, means for clipping the two sides of the loop together with a tubular clamp extending crosswise of the loop, and means for severing the string between successive loops.

6. Apparatus for applying string loops to tags having openings therein, comprising means for holding the tags with a string extending through their openings, means for moving the foremost tag from the succeeding tags, means for drawing said string through the succeeding tags to form a loop including said foremost tag, means for clamping a portion of a metal ribbon around the ends of the loop, and means for severing the loop from the string and ribbon.

7. Apparatus for applying string loops to tags having openings therein, comprising means for holding the tags with a string extending through their openings, loop-forming means for moving the foremost tag from the succeeding tags and drawing said string through the succeeding tags a distance sufficient to form a loop including said foremost tag, means for clamping a portion of a metal ribbon around the ends of the loop, and means for severing the loop from the string and ribbon while holding the end of the string in the clamped ribbon for a looping operation on the next tag.

8. Apparatus for applying string loops to tags having openings therein, comprising means for holding the tags in a pack with their openings in register with each other and a string extending therethrough, a slicer for moving the foremost tag edgewise from the pack, means movable transversely of the path of the slicer for drawing said string through said pack a predetermined distance to form the drawn string into a loop including said moved tag, means for folding a metallic clamp around the ends of the loop, and means for severing the loop from the string while holding the end of the string for a looping operation on the next tag in the pack.

9. Apparatus for applying string loops to tags having openings therein, comprising means for holding the tags in a pack with their openings in register with each other and a string extending therethrough, a guide extending transversely of the pack with a longitudinal slot to receive the end of the string, means for moving the foremost tag from the pack along one side of said guide with the tag overlapping the edges of the slot, means for drawing that portion of the string between the moved tag and the pack through said slot to form a loop including said moved tag, means on the other side of said guide for clamping a portion of a metal ribbon around the ends of the loop, and means for severing the ribbon and the loop from the string while holding the end of the string pinched in the ribbon for a looping operation on the next tag in the pack.

10. Apparatus for applying string loops to tags having openings therein, comprising means for holding a group of tags with a string extending through the openings therein, means for successively moving tags from the group and drawing said string through the group, means for alternately forming loops including the moved tags respectively, means for transversely clamping a metal ribbon around the portion of the string between loops, and means for severing the string and clamped ribbon between successive loops.

11. Apparatus for applying string loops to tags having openings therein, comprising means for holding the tags in a pack with their openings in register with each other and a string extending therethrough, loop-forming means for successively moving successive tags from the pack and alternately drawing said string through said pack a distance sufficient to form loops including tags respectively, means for transversely clamping a metal ribbon around the portions of the string between loops, and means for severing the string and clamped ribbon between successive loops.

12. String looping apparatus comprising an elongate guide having a string slot therein, a holder for holding a supply of string on one side of the guide, means on the other side of the guide for uniting the ends of string loops, means for severing the loops from the string while holding the end of the string for a subsequent operation, and looping means acting on a portion of the string between said holder and the guide including a looper for passing that portion through said slot into juxtaposition to said end of the string to form a loop to be united by said means.

13. String looping apparatus comprising an elongate guide having a string slot therein, a holder for holding a supply of string on one side of the guide, means on the other side of the guide for uniting the ends of string loops before the loops are severed from the string, means for severing the loops while holding the end of the string for a subsequent operation, and looping means acting on a portion of the string between said holder and the guide for passing that portion through said slot into juxtaposition to said end of the string to form a loop to be united by said means.

14. String looping apparatus comprising looping means, a holder for holding a supply of string for said looping means, fastening means for uniting the ends of string loops before the loops are severed from the string, means for severing the loops while holding the end of the string for a subsequent operation, and a looper acting on a portion of the string between said holder and said looping means for moving that portion into juxtaposition to said end of the string to form a loop to be united by said fastening means.

15. String looping apparatus comprising looping means, a holder for holding a supply of string for said looping means, fastening means for uniting the ends of string loops before the loops are severed from the string, means for severing the loops while positively holding the end of the string for a subsequent operation, a looper acting on a portion of the string between said holder and said looping means for moving that portion into juxtaposition to said end of the string to form a loop to be united by said fastening means, and means for adjusting the looping means and fastening means toward and from each other to vary the lengths of the loops.

16. String looping apparatus comprising means for joining together the ends of string loops, and means for twisting the string before the ends of the loops are joined together, whereby the sides of each loop tend to spiral together.

17. String looping apparatus comprising looping means, a holder for holding a supply of string for said looping means, means for clamping metal clips around the ends of the loops formed by said looping means, and means for severing the loops while positively holding the end of the string for a subsequent operation.

18. Method of making an attaching device involving the employment of a sheet metal blank having opposite parallel edges, comprising disposing strand sections in juxtaposed parallelism to the blank and with continuations extending away from said blank, bending the blank to a generally cylindrical shape in which said parts of the strands are gripped while causing the continuations of said strands to extend between the lateral edges of the bent blank.

19. Method of making an attaching device involving the employment of an elongate sheet metal blank of substantially U-shaped cross section and having straight parallel edges, disposing strand sections in parallel juxtaposition to the blank with adjoining strand portions disposed substantially at right angles thereto, bending the legs of the U-shaped blank toward each other until the edges are in close juxtaposition thus affording a generally cylindrical body enclosing the strand sections with the adjoining strand portions pinched between the lateral edges of the blank.

20. Method of making a plurality of attaching devices each including a bar-like retainer and a looped strand, comprising making an elongate sheet metal blank of U-shaped section and with straight parallel edges, disposing an elongate strand with spaced parts in juxtaposed parallelism to the blank and with looped portions spaced from the blank and connected to said parts by juxtaposed pairs of strand sections, bending the blank to generally cylindrical form firmly to engage said spaced parts of the strand with said pairs of sections extending between the edges of the bent blank, and then cutting the blank and strands between said pairs of strand sections, thus providing a plurality of devices wherein the strand loop is connected to the mid portion of the sheet metal retainer.

21. The method of making string loops which comprises bringing together spaced portions of a string adjacent the end of an elongate strip, clamping the end of the strip over said portions, and then cutting off the end of the strip.

22. The method of making attaching devices which comprises forming a series of spaced loops in a continuous string with the intermediate portions of the string extending along one side of an elongate strip, bending the strip transversely around said portions, and then severing said portions and strip between loops.

23. The method of making string tags which comprises threading a string through a series of tags, forming the string into a series of spaced loops with a tag in each loop and the intermediate portions of the string extending along one side of an elongate strip, bending the strip transversely around said portions, and then severing said portions and strip between loops.

24. The method of making string loops which comprises bringing together spaced portions of a string adjacent the end of an elongate strip, clamping the end of the strip over said portions, and then partially cutting off the end of the strip.

25. The method of making attaching devices which comprises forming a series of spaced loops in a continuous string with the intermediate portions of the string extending along one side of an elongate strip, bending the strip transversely around said portions, and then partially severing said portions and strip between loops.

26. The method of making string tags which comprises threading a string through a series of tags, forming the string into a series of spaced loops with a tag in each loop and the intermediate portions of the string extending along one side of an elongate strip, bending the strip transversely around said portions, and then partially severing said portions and strip between loops.

CARL A. FLOOD.